United States Patent
Nguyen et al.

(10) Patent No.: US 6,205,426 B1
(45) Date of Patent: Mar. 20, 2001

(54) UNSUPERVISED SPEECH MODEL ADAPTATION USING RELIABLE INFORMATION AMONG N-BEST STRINGS

(75) Inventors: Patrick Nguyen, Isla Vista; Philippe Gelin; Jean-Claude Junqua, both of Santa Barbara, all of CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/237,170

(22) Filed: Jan. 25, 1999

(51) Int. Cl.⁷ .................................................. G10L 15/14
(52) U.S. Cl. ........................................... 704/255; 704/251
(58) Field of Search ..................................... 704/251, 255

(56) References Cited

U.S. PATENT DOCUMENTS

| | | | |
|---|---|---|---|
| 5,835,890 | * 11/1998 | Matsui et al. | 704/255 |
| 5,864,810 | * 1/1999 | Digalakis et al. | 704/255 |
| 5,930,753 | * 7/1999 | Potamianos et al. | 704/256 |
| 5,970,239 | * 10/1999 | Bahl et al. | 704/245 |
| 6,076,053 | * 6/2000 | Juang et al. | 704/236 |

OTHER PUBLICATIONS

Tomoku Matsui, Tatsuo Matsuoka, and Sadaoki Furui, "Smoothed N–Best–Based Speaker Adaptation for Speech Recognition," Proc. IEEE ICASSP Apr. 1997, vol. 2, p. 1015–1018.*

Partick Nguyen, Philippe Gelin, Jean–Claude Junqua, and J.–T. Chien, "N–Best Based Supervised and Unsupervised Adaptation for Native and Non–Native Speakers in Cars," Proc. IEEE ICASSP Mar. 1999, vol. 1, p. 173–176.*

C. Leggetter and P. Woodland, "Maximum likelihood linear regression for speaker adaptation of continuous density HMMs", 1995, vol. 9, pp. 171–185, Computer Speech 2nd Language.

J.–L Gauvain and C.–H. Lee, "Maximum a posteriori estimation for multivariate gaussian mixture observation of Markov chains", 1994, No. 2, pp. 291–298, IEEE Trans SAP.

T. Matsui and S. Furui, "N–best–based instantaneous speaker–adaptation method for speech recognition", ICSLP 1996, vol. 2, pp. 973–976.

S. Homma, K. Aikawa and S. Sagayama, "Improved Estimation of Supervision in Unsupervised Speaker Adaptation", vol. II, pp. 1023–1026, Proc ICASSP 1997.

E. Thelan, X. Aubert, and P. Beyerlein "Speaker adaptation in the Philips system for large vocabulary continuous speech recognition", vol. 2, pp. 1035–1038, Proc. ICASSP 1997.

* cited by examiner

*Primary Examiner*—Tālivaldis I. Šmits
(74) *Attorney, Agent, or Firm*—Harness, Dickey & Pierce, P.L.C.

(57) ABSTRACT

The system performs unsupervised speech model adaptation using the recognizer to generate the N-best solutions for an input utterance. Each of these N-best solutions is tested by a reliable information extraction process. Reliable information is extracted by a weighting technique based on likelihood scores generated by the recognizer, or by a non-linear thresholding function. The system may be used in a single pass implementation or iteratively in a multi-pass implementation.

26 Claims, 1 Drawing Sheet

UNSUPERVISED SPEECH MODEL ADAPTATION USING RELIABLE INFORMATION AMONG N-BEST STRINGS

BACKGROUND AND SUMMARY OF THE INVENTION

The present invention relates generally to speech recognition and more particularly to speaker adaptation techniques for adapting the speech model of a speech recognizer to the speech of an individual user. The adaptation technique is unsupervised; that is, the adaptation system does not have a priori knowledge of the adaptation speech. Adaptation data is extracted from the adaptation speech using the speaker independent models available to the recognizer.

Speech recognizers in popular use today employ speech models that contain data derived from training speakers. In many cases training speech from these speakers is collected in advance, and used to generate speaker independent models representing a cross section of the training speaker population. Later, when the speech recognizer is used, data extracted from speech of the new speaker is compared with the speaker independent models and the recognizer identifies the words in its lexicon that represent the best match between the new speech and the speech models.

More often than not, the new speaker did not participate in the original speech model training. Thus the new speaker's speech may not be accurately represented by the speaker independent speech models. If the new speaker's speech patterns are sufficiently similar to those of the training population, then the recognizer will do a reasonably good job of recognizing speech provided by that new speaker. However, if the new speaker has a strong regional accent or other speech idiosyncrasies not reflected in the training population, then recognition accuracy falls off significantly.

To enhance the reliability of the speech recognizer, many recognition systems implement an adaptation process whereby adaptation speech is provided by the new speaker, and that adaptation speech is used to adjust the speech model parameters so that they more closely represent the speech of the new speaker. Some systems require a significant quantity of adaptation speech. New speakers are instructed to read long passages of text so that the adaptation system can extract the adaptation data needed to adapt the speech models. Having the new speaker read text that is known by the adaptation system in advance is referred to as "supervised" adaptation. It is generally easier to devise adapted models under supervised conditions because the adaptation system knows what to expect and can more readily ascertain how the new speaker's utterance differs from the expected.

However, in many applications it is not feasible or convenient for the new speaker to participate in a lengthy adaptation session. Indeed, in some applications it is simply not feasible to ask the user to speak adaptation sentences before using the system. These applications thus dictate "unsupervised" adaptation.

Performing unsupervised adaptation is considerably more difficult because the content of the adaptation data is not known in advance. More precisely, transcriptions of the adaptation data (labels associated with the adaptation data) are not known in advance. The recognizer must therefore attempt to provide its own transcriptions of the input utterance using its existing speech models. Depending on the quality of the models used to recognize speech, many errors can be introduced into the transcriptions. These errors, in turn, may propagate through the adaptation system, resulting in adapted speech models that do not accurately reflect the new speaker's speech. The adapted models may be no better than the speaker independent models, or they may even be worse.

The present invention provides a vehicle for speaker adaptation that is particularly well-suited to the task of unsupervised adaptation where only a small amount of adaptation data has been provided. Using the invention, adaptation data is supplied to the recognizer, which generates the N-best solutions (instead of merely generating the single best solution). These N-best solutions are then processed to extract reliable information by means of either a weighting technique or a non-linear threshold technique. This reliable information is then used to modify how the model adaptation system performs upon the speech models. The speech models can be adapted using a variety of techniques, including transformation-based adaptation techniques such as Maximum Likelihood Linear Regression (MLLR) and Bayesian techniques such as Maximum A Posteriori (MAP).

Although the reliable information extracted from the N-best solutions can be used in a single pass model adaptation system, the technique can also be performed iteratively. The iterative technique derives a first adapted model, as outlined above, and then uses the adapted model in a subsequent recognition cycle performed upon the adaptation data. The adaptation cycle can iteratively repeat multiple times. Each time the N-best solutions are determined and reliable information is extracted from those solutions to adjust how the model adaptation process is performed. A convergence testing mechanism monitors the N-best solutions to determine when to halt further iterations.

For a more complete understanding of the invention, its objects and advantages, refer to the following specification and to the accompanying drawings.

DESCRIPTION OF THE PREFERRED EMBODIMENT

Figure 1:
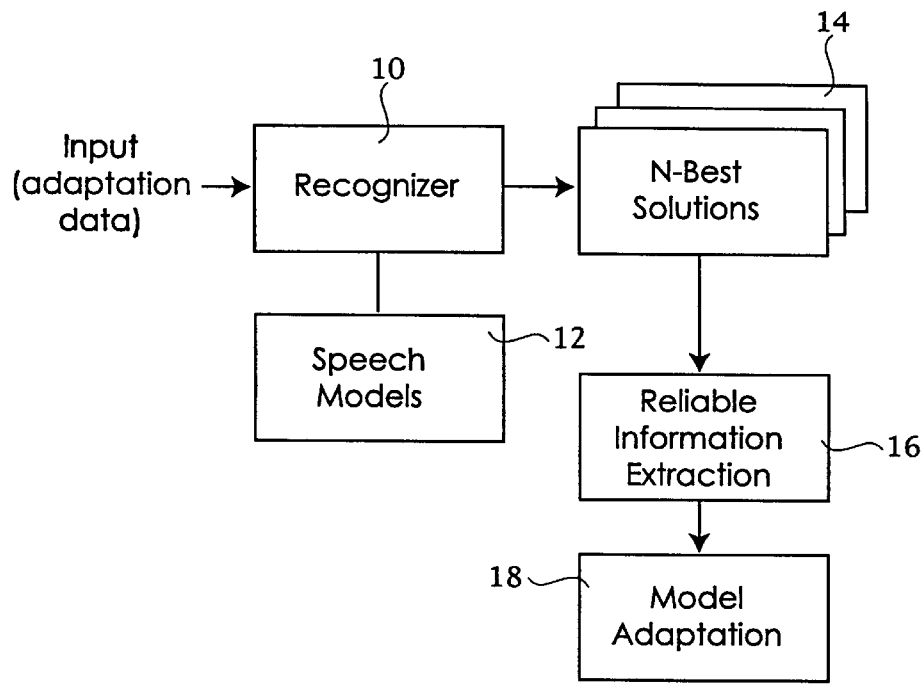
FIG. 1 is a block diagram illustrating the adaptation system of the invention in its single pass form.

The present adaptation system will work with a variety of different speech recognizer implementations. Thus, for illustration purposes, a model-based recognizer is illustrated at 10 in FIG. 1. Recognizer 10 operates in conjunction with a set of speech models 12. These models are supplied in an initial form, typically a speaker-independent form. The adaptation system adapts these models based on adaptation data supplied as input by the new speaker. Although there are a variety of different ways to model acoustic sounds, many recognizers in popular use today employ Hidden Markov Models to represent each of the sound units (e.g., words) within the recognizer's lexicon.

In most recognition applications the recognizer is designed to select the best solution, that is, the model that best corresponds to the input utterance. However, in this application the recognizer supplies the N-best solutions 14, that is, a predetermined fixed plural number of solutions or, alternatively, a plural number of solutions that had a recognition score greater than a predetermined threshold. In either case, recognizer 10 generates a score for each speech model, indicating the likelihood that the given model generated the input utterance. The likelihood score is used in a conventional recognizer to select the single best solution. In the present adaptation system, the N-best likelihood scores are used to generate a list of N-best solutions 14.

In some instances the adaptation data supplied as input will generate a correct solution as well as a plurality of incorrect solutions that nevertheless have high likelihood scores. Depending on the quality of the utterance, the correct solution may or may not necessarily have the highest likelihood score. In other instances, where the input utterance is of poor quality, the recognizer may generate a list of N-best solutions, none of which have a particularly high likelihood score. This demonstrates how difficult it can be for the recognizer to determine which recognition results are reliable and which are not.

The adaptation system addresses this problem by processing the N-best solutions to extract reliable information from the N-best solutions. This is illustrated diagrammatically in FIG. 1 by module 16 that performs the reliable information extraction function. Module 16 can take several forms. A first, presently preferred embodiment employs a weighting procedure whereby each of the N-best solutions is assigned a weight according to the difference in likelihood between the first and the n-th solution. This presently preferred embodiment performs the calculation expressed in equation 1 below to assign a weight to each of the N-best solutions.

$$\phi_n = \exp([L_n - L_1]\eta), \qquad \text{Equation 1}$$

In the above equation $L_1$ is the log likelihood of the first best hypothesis; $L_n$ is the log likelihood of the n-th best hypothesis; $\phi_n$ is, by definition, less than or equal to 1 and $\eta$ is a heuristic parameter that represents prior confidence on the decoded labels. When $\eta$ approaches infinity, the best hypothesis is expected to be correct and a 1-best adaptation is performed. If $\eta$ approaches zero then an equal weighting is applied to the N-best hypotheses. The value of $\eta$ selected for a given application may be determined heuristically. In the present implementation we use a value for $\eta$ in the range of 0.01 to 0.1. However, $\eta$ is a measure of confidence applied to the speech recognition process as a whole and therefore needs to be fine-tuned to match the recognizer employed.

The exponential weighting determined by equation 1 naturally produces a reliable information extraction. Solutions that have a high relative likelihood are given a high weight and solutions with a low likelihood are essentially discarded.

An alternative to the weighting technique, another presently preferred embodiment employs a non-linear thresholding function within module 16. The non-linear function counts the number of times a given sound unit (e.g., word) appears in the N-best solutions for a given string (e.g., sentence). A thresholding function may then be used to separate the reliable information from the unreliable information.

To illustrate the concept of a non-linear thresholding function, consider the following example in which the sound units being modeled correspond to individual letters and thus an input string or "sentence" would consist of a sequence of spoken letters, as if by spelling. Assume that the first three N-best solutions are "a a c", "b b c" and "a b c." Further assume that the correct label for the input observation is "a b c." By setting the correct threshold greater than or equal to two, the system will remove the incorrect parts of the above solutions. Thus 'b' in the first position of the second solution and 'a' in the second position of the first solution would be eliminated as unreliable, because they did not occur with a high enough frequency.

While the foregoing has described both a computationally-derived weighting factor and a non-linear information extraction function, other reliable information extraction processes may be employed. In this regard, recognize that the log likelihood calculation expressed in equation 1 represents an approximation of the likelihoods calculated across all possible sound units in the grammar or lexicon. In other words, the calculation in equation 1 takes into account only the N-best solutions and bases the accumulated weight on those N-best solutions. Other systems may be devised such that the weights are based upon a number of solutions greater than or less than the number of N-best solutions.

Regardless of the manner of reliable information extraction employed at 16, the reliable information is used by model adaptation module 18 to selectively adapt the speech models 12. The manner in which adaptation is performed will depend upon the adaptation technique selected. If the adaptation technique is a transformation-based technique such as MLLR, equation 2 is used to transform the mean vectors.

$$\hat{\mu} = W\mu + b, \qquad \text{Equation 2}$$

In the above equation where $\hat{\mu}$ and $\mu$ are respectively the adapted and original mean vector; W and b are the transformation matrix and bias derived to optimize the maximum likelihood through the optimization of Baum's "auxiliary function" of Equation 3.

$$Q(\mu, \hat{\mu}) = \sum_{\theta \in states} L(O, \theta | \mu) \log(L(O, \theta | \hat{\mu})), \qquad \text{Equation 4}$$

where $L(O,\theta|\mu)$ stands for the likelihood of the observation O, and the sequences of states, $\theta$, given the specific mean vector $\mu$.

On the other hand, if the adaptation technique is a Bayesian technique such as MAP equation 4 is used to adapt the speech models.

$$\mu_{MAP} = \frac{\tau\mu_0 + \sum_t \gamma(t)o_t}{\tau + \sum_t \gamma(t)}, \qquad \text{Equation 3}$$

In the above equation, $\tau$ is a measure of confidence on the prior ($\tau=15$ in our implementation) and $\gamma$ is the observed posterior probability of the observation.

Both adaptation techniques can be performed serially, that is, first one and then the other. The techniques of the invention support this application. Note that regardless of how the reliable information is extracted by module 16, the model adaptation procedure of the invention changes the way in which conventional adaptation techniques are applied by forcing the adaptation techniques to operate based upon reliable information extracted from the N-best solutions while sifting out or minimizing the effect of unreliable information.

Figure 2:
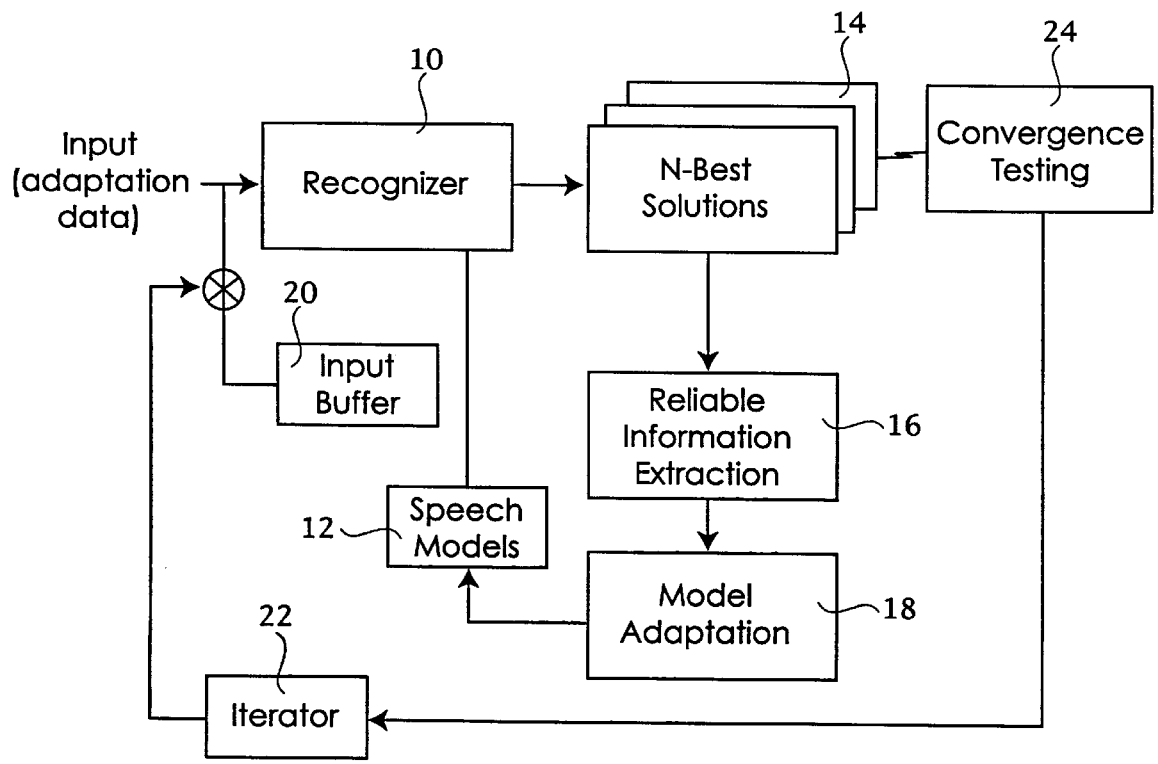
FIG. 2 is a block diagram of the adaptation system illustrating how a multiple pass system may be implemented using iteration.

While the adaptation system can be used in a single pass embodiment, as illustrated in FIG. 1, iteration may also be used to perform multi-pass adaptation upon the input adaptation data. One such multi-pass embodiment is illustrated in FIG. 2. The embodiment of FIG. 2 is constructed essentially as described above, in which recognizer 10 supplies the N-best solutions 14, which are then processed at 16 to extract reliable information. The information is then used to adapt the speech model at 18, using any of the techniques described above.

In the multi-pass embodiment, the input adaptation data may be stored in an input buffer 20, allowing the adaptation data to be processed multiple times after each successive adaptation is made to the model. Thus the input adaptation data is first analyzed by recognizer 10 using the initial speech models 12 and this results in modification of the speech models, as described above. Then, using the adapted speech models, the adaptation data from input buffer 20 is fed through the system again, to generate a second set of adapted speech models. The procedure is mediated by iterator 22, which causes the adaptation cycle to repeat multiple times until the system converges upon a final solution. Convergence testing module 24 analyzes the N-best solutions 14, comparing the current N-best solutions with the corresponding solutions from a previous pass. Once the convergence testing module detects that there is very little change in either the N-best solutions, or their respective likelihood scores, the iteration process is terminated.

An alternate preferred embodiment of the multi-pass approach is to iterate a predefined fixed number of time, reducing the convergence testing module to a simple counter.

The adaptation system of the invention, in either its single pass form or its multi-pass form, will selectively apply the adaptation technique (or techniques) based on reliable information extracted from the N-best solutions. To further understand the invention in operation, consider the following example taken from an exemplary application in which letters are spoken to input spelled words or names. Such a system might be used in a car navigation system, for example. In this context the recognizer is trained to recognize individual letters (functioning as words) and an entire spelled name sequence would represent a series of letters (constituting a spoken sentence).

The user utters the input sentence: b-o-b (as if to spell the name Bob as in Bob's Bar and Grill). Recognizer 10 pre-processes the sentence comprising the spoken words b-o-b, to extract feature vectors corresponding to the recognized sound units (in this case spoken letters).

The recognizer returns the N-best solutions. For purposes of this example, assume the recognizer returns the following four-best solutions, with their associated likelihood considered as the reliable information extracted from the recognizer:

b-o-b $L_1=10$,
c-o-b $L_2=6$,
t-o-p $L_3=3$,
d-e-b $L_4=1$.

For this example, assume that the weighting procedure is using a simple ratio procedure as:

$$w_n = \frac{L_n}{\sum_i L_i}$$

leading to
$w_1=0.5$
$w_2=0.3$
$w_3=0.15$
$w_4=0.05$

Thus, in the above example, the weight associated to the first letter "b" would be assigned a weight of 0.5, the weight for the second letter "o" would be assigned a weight of 0.95 (the letter "o" appears in the first three N-best, and its weight is the sum of the weights=0.5+0.3+0.15=0.95), and so forth. Once weights are assigned, the model adaptation process can be performed by conventional means. However, the results of model adaptation will be different from the results achieved through conventional means, in that the model adaptation system has altered the weights of certain solutions, causing them to be favored (if reliable) or less emphasized (if unreliable).

While the invention has been described in its presently preferred embodiments, it will be understood that the principles of the invention can be incorporated into a variety of different recognizer configurations. Moreover, although MAP and MLLR have been described here as two possible adaptation techniques, the invention is not limited to those techniques. Rather, the principles for extracting reliable information from the N-best solutions can be exploited with a wide variety of different adaptation techniques. To implement the principles of this invention with other types of adaptation techniques, one may use the extracted reliable information to determine, for example, how many times the adaptation technique is performed upon a given entity or variable. In general, the more times an adaptation technique is performed, the greater emphasis it is given to the adaptation data. Thus the results of reliable information extraction can be used to mediate how many times adaptation is performed and thus affect how much emphasis is given to the adaptation data.

What is claimed is:

1. A method for adapting a speech model based on unsupervised input speech from the user of a speech recognizer, comprising:

using said recognizer to extract the N-best recognition solutions based on said speech model;

selecting from said N-best recognition solutions a set of reliable recognition candidates, and supplying said set of reliable recognition candidates to an adaptation system to adapt said speech model.

2. The method of claim 1 wherein said recognizer generates likelihood information and wherein said N-best recognition solutions are selected by assigning weights to said N-best recognition solutions based on said likelihood information.

3. The method of claim 1 wherein said N-best recognition solutions are selected by using a non-linear thresholding function to select said set of reliable recognition candidates.

4. The method of claim 1 further comprising using a transformation-based adaptation system to adapt said speech model based on said set of reliable recognition candidates.

5. The method of claim 4 wherein said transformation-based adaptation system employs maximum likelihood linear regression.

6. The method of claim 1 further comprising using a Bayesian-based adaptation system to adapt said speech model based on said set of reliable recognition candidates.

7. The method of claim 6 wherein said Bayesian-based adaptation system employs maximum a posteriori adaptation.

8. The method of claim 1 further comprising iteratively performing said extracting, selecting and supplying steps.

9. The method of claim 1 further comprising iteratively adapting said speech model and submitting said input speech to said recognizer multiple times.

10. The method of claim 1 further comprising iteratively performing said extracting, selecting and supplying steps while testing said N-best recognition solutions for convergence.

11. The method of claim 1 further comprising determining the log likelihood of said N-best recognition solutions and using said log likelihood to select said set of reliable recognition candidates.

12. The method of claim 1 further comprising counting the number of times a given sound unit appears in said N-best recognition solutions and using the count to select said set of reliable recognition candidates.

13. A speech recognition apparatus that adapts an initial speech model based on unsupervised input speech from the user, comprising:

a speech model that represents speech as a plurality of speech unit models associated with a plurality of speech units;

a speech recognizer that processes input speech from a user using said speech model to generate the N-best recognition solutions;

a reliable information extractor for analyzing said N-best recognition solutions to select a set of reliable recognition candidates from said N-best recognition solutions; and an adaptation system that uses said reliable recognition candidates to adapt said speech model.

14. The speech recognition apparatus of claim 13 wherein said speech recognizer generates likelihood information and wherein said information extractor employs a weighting procedure whereby said N-best recognition solutions are assigned weights based on said likelihood information.

15. The speech recognition apparatus of claim 13 wherein said information extractor employs a non-linear thresholding function to select said set of reliable recognition candidates.

16. The speech recognition apparatus of claim 13 wherein said adaptation system comprises a transformation-based adaptation system.

17. The speech recognition apparatus of claim 13 wherein said adaptation system employs maximum likelihood linear regression.

18. The speech recognition apparatus of claim 13 wherein said adaptation system comprises a Bayesian-based adaptation system.

19. The speech recognition apparatus of claim 13 wherein said adaptation system employs maximum a posteriori adaptation.

20. The speech recognition apparatus of claim 13 further comprising iterator for iteratively adapting said speech model and submitting said input speech multiple times through said speech recognizer.

21. The speech recognition apparatus of claim 20 further comprising convergence testing mechanism for monitoring said N-best recognition solutions to determine when to halt iteration.

22. The speech recognition apparatus of claim 13 wherein said speech recognizer generates likelihood information and wherein said information extractor employs a weighting procedure whereby said N-best recognition solutions are assigned weights based on the log of said likelihood information.

23. The speech recognition apparatus of claim 13 wherein said information extractor employs a non-linear thresholding function that counts the number of times a given sound unit appears in the N-best recognition solutions to select said set of reliable recognition candidates.

24. The speech recognition apparatus of claim 13 wherein said adaptation system comprises plural, diverse adaptation mechanisms, each mechanism using said reliable recognition candidates to adapt said speech model.

25. The speech recognition apparatus of claim 24 wherein said adaptation mechanism comprise at least one transformation-based adaptation system and at least one Bayesian-based adaptation system.

26. The speech recognition apparatus of claim 25 wherein said transformation-based adaptation system employs maximum likelihood linear regression and wherein said Bayesian-based adaptation system employs maximum a posteriori adaptation.

* * * * *